Nov. 8, 1966  B. E. WAGNER  3,283,438
APPARATUS FOR DETECTING FISH-BITE
Filed Feb. 4, 1965
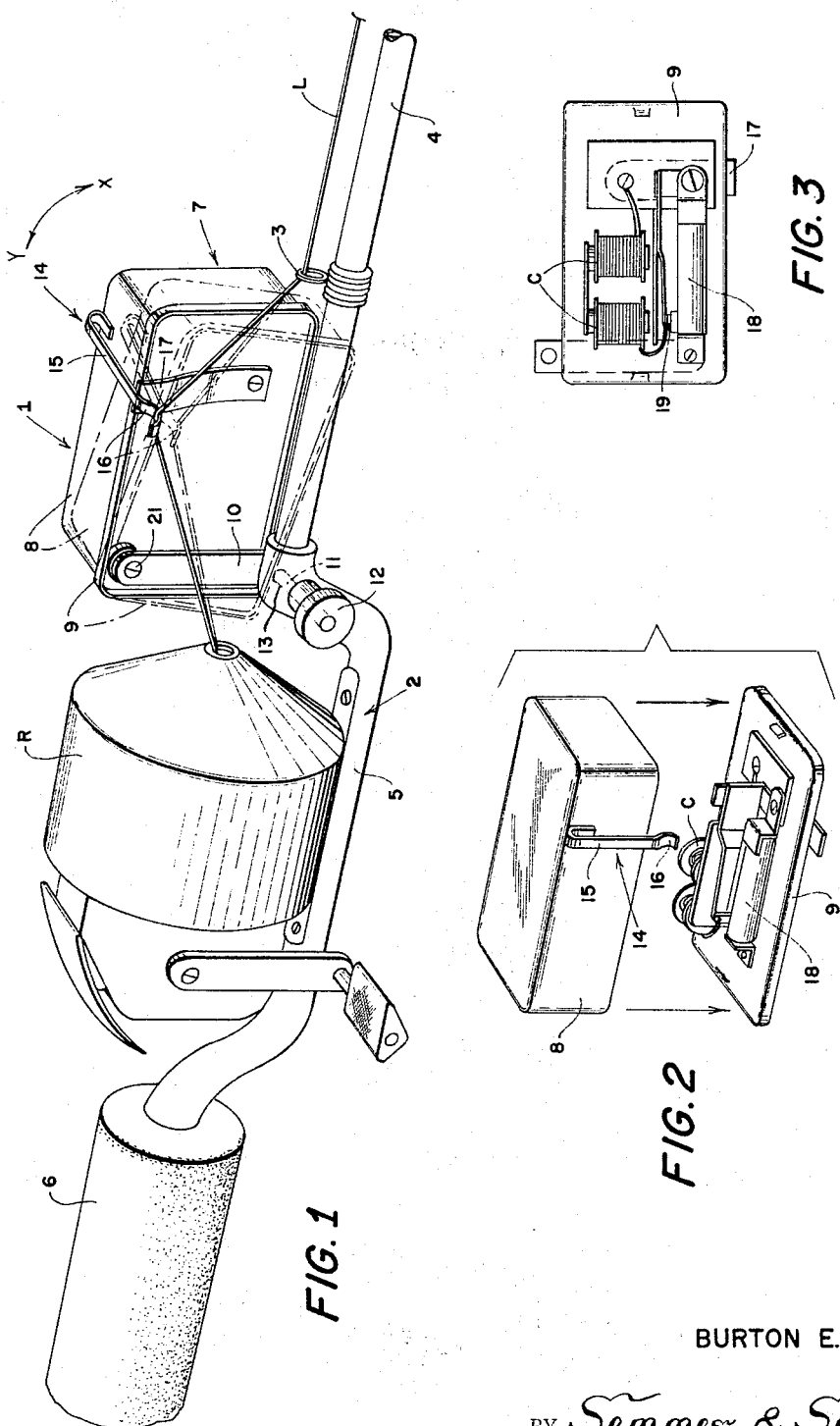
INVENTOR
BURTON E. WAGNER
BY Semmes & Semmes
ATTORNEYS ber adapted to engage the undersurface of the fishing line in such a manner that the line may be disengaged from the actuating member by a single movement of the thumb or finger of the fisherman resulting in a minimum loss of tension on the fishing line.

United States Patent Office 3,283,438
Patented Nov. 8, 1966

3,283,438
APPARATUS FOR DETECTING FISH-BITE
Burton E. Wagner, 350 W. Crocker St., Fostoria, Ohio
Filed Feb. 4, 1965, Ser. No. 430,390
5 Claims. (Cl. 43—17)

The present invention relates generally to an apparatus for detecting a fish-bite and particularly to a suggested signalling device readily attachable to any type of fishing rod to provide audible or other types of perceptive signals at the instant the fish has taken the bait.

Numerous devices, in the field of attachments for fishing rods to provide signals upon the sudden pulling of the fishing line by the strike of a fish upon the bait, are the subject of U.S. patents. Note, for example, Cook (U.S. Patent No. 657,518); Schwebs (U.S. Patent No. 2,409,-988); Linder U.S. Patent No. 2,446,427); Kuczynski et al. (U.S. Patent No. 2,574,333); Schenkel (U.S. Patent No. 2,619,559); Collins (U.S. Patent No. 2,755,590); Frazier (U.S. Patent No. 2,814,900); and Crowe et al. (U.S. Patent No. 2,816,387).

For the most part, the prior signal devices, including those described in the above-listed patents, are relatively complicated, expensive, and designed to be incorporated into the fishing rod at the time of manufacture to thus constitute a structurally integral part of the rod itself. Other prior known accessories, though not constituting a structural part of the rod itself, require some "special" modification of the rod or reel before the signalling device can be incorporated within the fishing gear.

In equipment of this type, employing signalling devices constituting an integral part of the rod or requiring special modification of the rod, the fishing line usually passes over, around or through a member forming a portion of the signal device, which member is actuated when the fishing line is pulled away from the reel in order to close an electrical circuit adapted to control the signal means. In most of these cases, the reel is operated to play the hooked fish with the fishing line still engaging or disposed within the actuating member of the signal device. This is very awkward inasmuch as the fishing line is axially displaced, from its normal line of direction leading to the fishing reel, by the actuating member and thereby produces an additional resistance to the force required to reel in the line. In those cases where means is provided for releasing the fishing line from the actuating member after the fish has taken the lure, the motions required on the part of the fisherman are very awkward at best, and it is usually necessary to slacken the line in order to disengage it from the actuating member. Such movement is to be avoided at this most critical time, when it is most advantageous to maintain the fishing rod taut in order to insure the sinking of the hook to preclude the possibility of losing the catch.

Since most ardent fishermen maintain a rather extensive collection of fishing rods, it is desirable that the signalling device be readily detachable from any particular rod and attachable on another rod. Otherwise, the sportsman would be required to purchase a separate signalling device for each rod.

Accordingly, the primary object of the present invention is to provide a device for detecting fish-bite.

Another object of the present invention is to provide a fish-bite signalling device which is entirely self-contained and readily adaptable to be attached to any type of fishing rod.

Still another object of the present invention is to provide a fish-bite signalling device for producing an audible signal including means for regulating the sensitivity of the fishing line upon the signal producing mechanism.

Still a further object of the present invention is to provide a fish-bite signalling device having an actuating member adapted to engage the undersurface of the fishing line in such a manner that the line may be disengaged from the actuating member by a single movement of the thumb or finger of the fisherman resulting in a minimum loss of tension on the fishing line.

Still a further object of the present invention is to provide a fish-bite signalling device utilizing a metal cover which functions as a conductor, upon actuation of a conventional lever, resulting in simplicity in wiring circuitry.

Yet additional objects of invention will become apparent from the ensuing specification and attached drawings wherein:

FIG. 1 is a perspective view of the fish-bite signalling device according to the present invention particularly illustrated alternate positions of the device as mounted on a conventional fishing pole.

FIG. 2 is an exploded perspective view of the fish-bite signalling device removed from the fishing pole.

FIG. 3 is a side view of one form of audible signalling mechanism which may be used in conjunction with the present invention.

Referring now to FIG. 1, the fish-bite signal device according to the present invention is generally designated 1 and is illustrated herein removably attached to the fishing pole generally designated 2 at a point intermediate the reel R and the nearest line guide loop 3 adjacent to the reel. The fishing pole 2 includes the usual flexible rod portion 4 secured by any suitable means to the forward end of a mounting section 5 and is provided with a rearmost hand grip section 6.

A further feature of the present invention is that the signal device may be utilized in combination with any type of reel, not only the particular reel R illustrated in FIG. 1.

The signal indicating device includes a housing generally designated 7 consisting of a side cover 8 and a side base 9. As will be clearly seen in FIG. 1, the present invention is provided with mounting means which disposes the device in a lateral plane offset to one side from the path of the fishing line L leading from the rearmost guide loop 3 to the reel R. In this manner, there will be no interference with the line after the fisherman disengages same from the signal actuating member.

The mounting means comprises an arm 10 attached to side base 9 in rotating relationship about pin 21, so as to permit radial adjustment of the signal device as seen in FIG. 1. This permits the alarm to be set for a strong tug or for a hair trigger pull, as well as permitting the alarm to be quickly pushed below the rod where it does not engage the line permitting normal fishing. Attached adjacent the lower free end of the arm 10 and in a plane normal to said arm is a pivot shaft or attaching member 11 provided with screw threads thereon for the reception of a suitable lock screw 12 having internal threads mating with the threads on the shaft 11. From the foregoing construction, it will be seen that it is but a simple matter to removably attach the signal device to a fishing pole by merely providing a suitable transverse bore 13 through the mounting section 5. Quite obviously, any other manner of removably attaching the signal device to the fishing rod, such as any simple clamp assembly, may be utilized as long as the resultant mounting ensures the required adjustability of the device. The manner of attaching the device as illustrated in the present drawing is the most readily adaptable since it merely requires the provision of a single transverse bore 13 through the mounting section 5 of the fishing rod and this adaptation may be readily employed in the majority of the types of fishing rods available.

An important feature of the above described mounting assembly is that the arm 10 is disposed adjacent the rear edge of the housing 7 while the actuating means for producing the signal is disposed adjacent the opposite or forward edge of the housing 7. Attached to the upper surface of side cover 8 is a movable contact member generally designated 14 including a resilient actuating arm 15 disposed across the top of the cover 8 in a direction transverse to the path of the fishing line L and including at the outer free end thereof an upwardly directed generally V-shaped cradle 16, the intermediate lowermost portion of which is disposed in the same vertical plane as the line L occupies between the rearmost guide loop 3 and the reel R.

Attached to the side base 9 and projecting upwardly therefrom is a contact member or arm 17, the uppermost surface thereof disposed immediately beneath the undersurface of the resilient actuating arm 15 in a normally spaced apart relationship therewith.

When it is desired to utilize the signal device, arm 10 is adjusted about pin 21 in order to elevate the forward portion of the housing 7 to cause the V-shaped cradle 16 at the end of the actuating arm 15 to engage the undersurface of the line L. The housing is pivoted about the pin 21 to any desirable point wherein it will be seen that various degrees of tension may be applied to the cradle 16 by the selective pivotal positioning of the arrowhead designated Y, the sensitivity of the signal device is increased since it will be seen that the included angle formed by the line L as it leads to, and proceeds away from, the V-shaped cradle 16 will be lessened or made more acute thereby increasing the mechanical advantage obtained when any tension or resistance is applied at the forwardmost portion of the line L. In other words, it will be understood that when the housing is elevated to its maximum point, a minimum force or resistance will be required to depress the actuating arm 15 against its inherent resiliency to close the normal gap between the arm 15 and the uppermost portion of the fixed contact arm 17.

On the other hand, as the housing is depressed or angularly displaced about the pin 21 in the direction of the arrowhead designated X, the sensitivity of the signal device will be decreased inasmuch as the included angle formed by the line L passing over the V-shaped cradle 16 will be increased, thereby requiring a greater force on the line L to depress the actuating arm 15 into contact with the upper portion of the arm 17.

In the foregoing manner, the sensitivity of the signal device may be selected in accordance with the amount of drag or resistance formed by the reel R and other varying conditions under which the invention will be used such as force of water currents, or size and type of fish being sought.

Whenever the line L is disposed within the cradle 16 and the included angle formed by the line passing therethrough is less than 180°, it will be seen that when sufficient force or resistance is applied to the line L, the actuating arm 15 will be pulled downwardly into engagement with the top of the contact arm 17. This contact is actually a switch means and closes an electrical circuit which may be adapted to actuate any type of suitable signalling means such as the buzzer disclosed in the present invention.

It will be understood that any type of signal means may be utilized in addition to an audible signal, such as a light bulb to produce a visual signal. As shown in FIGS. 2 and 3 of the drawing, a pair of coils C are electrically connected in series with a source of electrical energy such as the dry cell 18 and breaker contacts 19. One leg of the circuit is grounded to the conductive side base 9, while the other leg of the circuit is connected to contact arm 17. The grounded leg of the circuit is carried to the electrically conductive actuating arm 15 from the conductive side base 9 by means of the conductive side cover 8, which is electrically joined to the base 9 by any suitable means.

It will thus be seen from the foregoing description that a circuit is formed between the conductive actuating arm 15 and the conductive contact arm 17 such that whenever these two arms are forced into engagement by tension being applied to the fishing line L, a closed circuit is obtained and the signalling means will be actuated.

When a fish bites and tension is applied to the line L to actuate the signal device, the fisherman readily disengages the line from the V-shaped cradle 16 by a simple side pressure to the line between the rearmost guide 3 and the reel R in order to slide the line out of the cradle and over the free end of the actuating arm 15. That is, the line can be flipped and disengaged with the thumb once the fish takes the bite. In view of the offset disposition of the housing 7, it will follow that the line L will assume its normal straight line position between the guide 3 and reel R and may be subsequently played without any interfering contact with the signal device.

Manifestly, still further modifications of the present invention may be employed without departing from the scope of invention as defined by the subjoined claims.

I claim:

1. A signal device for attachment to a conventional fishing pole having a reel with a line extending therefrom through a guide loop, comprising:
   (A) a housing having a mounting arm extending therefrom;
   (B) means on said arm spaced from said housing for attaching said housing to said pole in angularly adjustable position intermediate said loop and said reel and in a vertical plane off-set to one side of said line,
   (C) a movable contact member extending transversely from said housing into the vertical plane of said line;
   (D) a fixed contact member extending from said housing to a point normally spaced from said movable contact member;
   (E) means adjacent the free end of said movable contact member adapted to engage said line and to vertically displace same when said housing is angularly adjusted about said attaching means; and
   (F) electrical signal producing means within said housing connected in series with said movable and fixed contact members, whereby tension applied to said line displaces said movable contact member from its normal spaced apart position into engagement with said fixed contact and to close the circuit of said electrical signal producing means.

2. A signal device as in claim 1, including adjusting means attached to said mounting arm at its juncture with said housing so as to permit rotation of said housing about said arm.

3. A signal device as in claim 2, wherein said mounting arm projects downwardly from said housing adjacent one side thereof and said attaching means includes a transverse pivot shaft adapted to pass through a pre-selected opening in said pole.

4. A signal device as in claim 3, wherein said housing includes a base and a cover and said fixed contact member and said mounting arm are attached to said base while said movable contact member is attached to said cover.

5. A signal device as in claim 4, wherein said pivot shaft includes releasable locking means permitting selective angular displacement of said housing.

References Cited by the Examiner

UNITED STATES PATENTS

| | | | |
|---|---|---|---|
| 2,619,559 | 11/1952 | Schenkel | 43—17 X |
| 2,680,842 | 6/1954 | Opphile | 43—17 X |
| 2,814,900 | 12/1957 | Frazier | 43—17 |
| 2,930,158 | 3/1960 | McQuiston | 43—17 |

FOREIGN PATENTS 637,843    5/1950    Great Britain.

SAMUEL KOREN, *Primary Examiner.*

D. J. LEACH, *Assistant Examiner.*